March 20, 1934.  W. G. PREDDEY  1,951,707
ATTACHMENT FOR PROJECTORS
Filed May 2, 1932  2 Sheets-Sheet 1

INVENTOR.
WALTER G. PREDDEY
BY
ATTORNEYS.

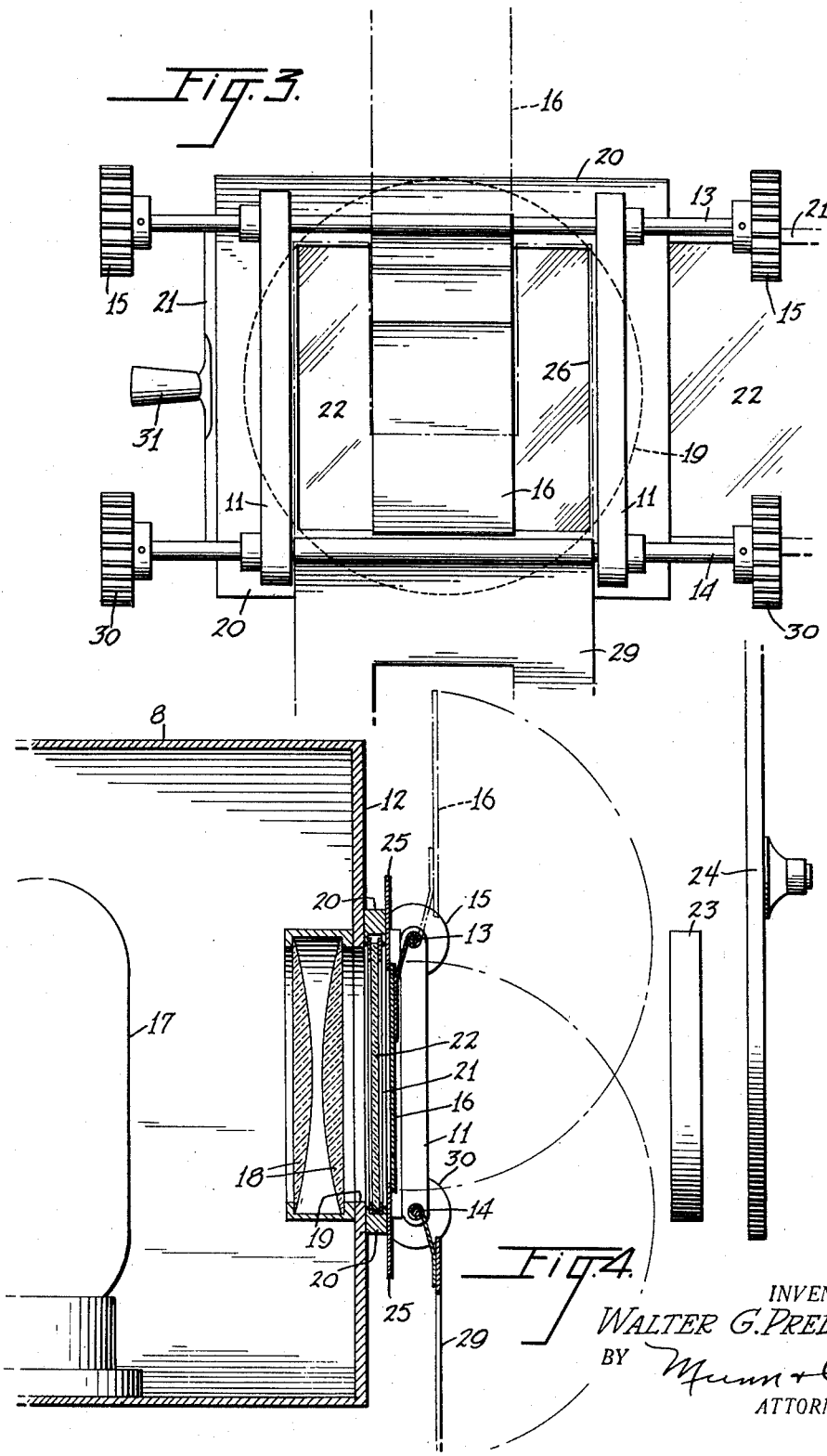

Patented Mar. 20, 1934

1,951,707

UNITED STATES PATENT OFFICE 1,951,707

ATTACHMENT FOR PROJECTORS

Walter G. Preddey, San Francisco, Calif.

Application May 2, 1932, Serial No. 608,804

7 Claims. (Cl. 88—24)

My invention relates to improvements in attachments for projectors, and it consists of the combinations, constructions and arrangements hereinafter described and claimed.

In moving picture houses and theaters, considerable money is expended for stage decorations, such as valances and drapes, and these are hidden from the public most of the time, due to the dim lighting which is necessary in the showing of moving pictures. It is the purpose of the present invention to provide novel means for illuminating the valance and drapes during the showing of a picture without affecting the picture. The valance and drapes, when lighted up, act as a frame surrounding the picture and enhance the beauty of the stage.

It is desirable to control the lighting of the drapes from the operator's room, and I have therefore provided an attachment for a projector which will block out the light that normally would strike the screen and only permits light which is directed toward the valance and the drapes. A mask is used which will permit light to illuminate the valance and the drapes and which will cut off any light that would be directed toward the wall surrounding the stage.

I further provide means for reversing the light projected toward the stage so that the light will illuminate the picture area on the screen and will be prevented from lighting up the valance and the drapes. With such a light directed on the screen, it is possible to project various forms of designs and change the colors of the designs and also the intensity of the light. In this way, various novel stage effects may be produced and, if desired, the light can be thrown on the screen while the picture is being shown so as to give a background to certain types of pictures.

A further object of my invention is to provide a device of the type described, which is extremely simple in construction and which may be quickly attached to a standard projector used in moving picture houses and the like.

Other objects and advantages will appear in the following specification, and the novel features of the device will be particularly pointed out in the appended claims.

My invention is illustrated in the accompanying drawings forming a part of this application, in which Figure 1 is a front elevation of a stage and indicates by broken lines what areas are illuminated and what areas are darkened;

Figure 3 is an enlarged front elevation of the attachment; and

Figure 4 is a longitudinal section through the device as shown operatively applied to a lamp projector.

In carrying out my invention, I make use of a stage, indicated generally at 1, this stage having a screen 2, drapes 3 and a valance 4. The area of the screen 2 designed to receive pictures is enclosed by a frame 5. The parts thus far described are standard in construction and form no part of the invention except insofar as they cooperate with the parts now to be described.

Figure 2:
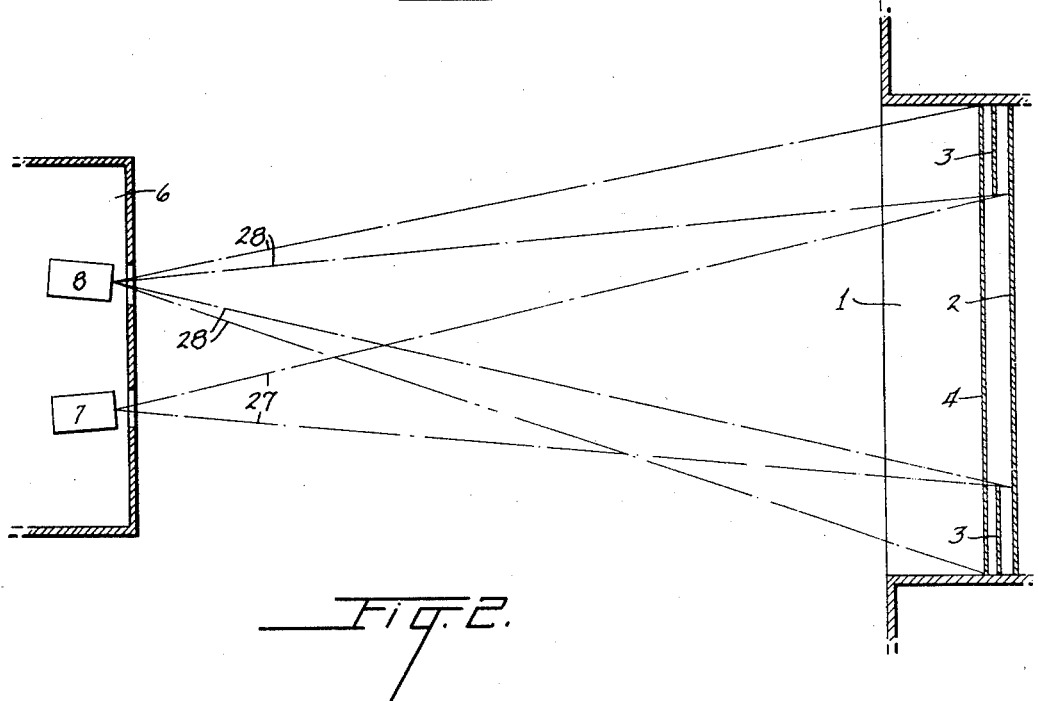
Figure 2 is a horizontal section through the stage and the projector room showing diagrammatically how the projector can be used in combination with a standard moving picture projector.

In Figure 2, I show the stage 1 and further show the drapes 3 as being positioned in front of the screen 2, and the valance 4 as being disposed in front of the drapes.

Figure 1:
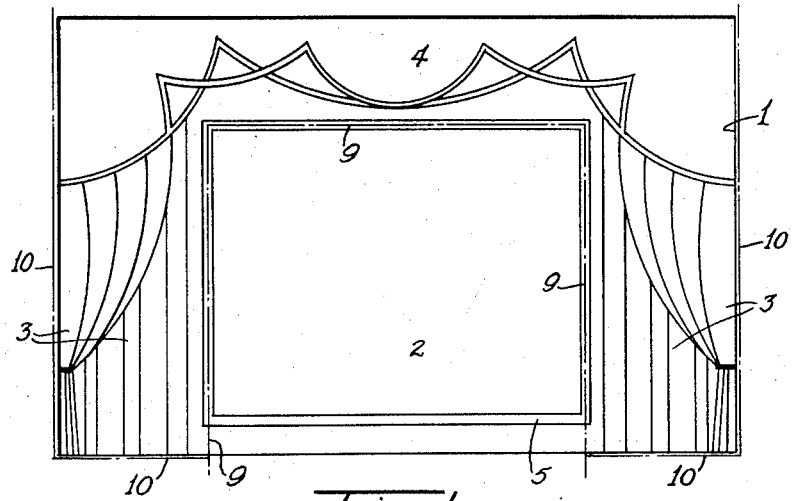

This exact arrangement need not be followed, and I am merely showing the parts arranged in this manner in order to set forth one embodiment of my invention. I also make use of a projector room 6, in which are mounted the usual machines for the showing of pictures. I have indicated a moving picture projector at 7 and a lamp projector at 8. The attachment is secured to the projector 8 and consists of two movable masks for cutting off the light from the projector. One mask is designed to cut off light that would strike the screen 2, and the area on the stage covered by the mask is indicated by the broken lines 9 in Figure 1. The other mask is in the shape of a U and will be hereinafter described, and when this mask is brought into position, it will cut off the light which was illuminating the valance and the drapes. The area of light cut off by the second mask is indicated by the same broken lines 9 and broken lines 10.

I will now describe the attachment. The attachment is shown in Figures 3 and 4, and it will be noted from these figures that supports 11 are mounted on the front face 12 of the projector 8 and that these supports rotatably carry rods 13 and 14. The rod 13 is provided with two knobs 15 so as to be manually actuated from either end and the rod carries a mask 16 which is designed to be swung into the path of the projected light so as to cut off the light directed toward the screen 2. Since the image thrown by the projector 8 is inverted, I have shown the mask 16 as swinging downwardly from the top of the projector and the shadow thrown by this mask will extend upwardly from the floor of the stage, as indicated by the broken lines 9 of Figure 1. The rod 13 may be manually rotated, but is frictionally held in any position into which it is rocked. When the mask 16 is not in use, it occupies the position shown by the broken lines in Figure 3.

It will be noted from Figure 4 that the light rays from the projector 8 are generated by a lamp 17, or other suitable light source, and these rays are passed through lenses 18 in the usual manner. The rays then pass through an opening 19 in the front wall 12. Guideways 20 are positioned in front of the opening 19 and receive a slidable frame 21 which has two openings for receiving transparent members. These members can be figured glasses, stereopticon slides, etc. If desired, the transparent members 22 may be removed from the frame 21 and the frame will then not interfere with light rays passing through the opening 19.

I have shown a second lens holder 23 positioned in front of a disc 24, the disc having a number of windows, not shown, with various colored transparent members. The disc may be manually rotated or rotated by a motor. The purpose of the disc is to cause light rays passing therethrough to be colored in any manner desired. The lens 23 and disc 24 are standard parts of the projector 8.

The opening 19 is shown in Figure 3 by dotted lines, and this would throw a round disc of light which would not only illuminate the entire stage, but which would also illuminate the walls surrounding the stage. In order to prevent this, I provide a mask 25, having an opening 26 of the proper proportions so as to cut off all light rays which are not directed toward the stage. In this way, only the stage is illuminated when the projector 8 is used.

If now it is desired to show a moving picture on the screen 2, the moving picture projector 7 is used, and this will throw the pictures on the screen, as indicated by the broken lines 27 in Figure 2. When the feature picture is being shown, it is best to cut off light rays from the projector 8 that are directed toward the screen 2. This is accomplished by moving the mask 16 into the full-line position shown in Figure 3. The rays projected from the projector 8 will illuminate the drapes and the valance and will take the path indicated by the broken lines 28 shown in Figure 2.

As already stated, the valance and drapes will act as a frame which will surround the picture. Should the operator wish to cut off light rays to the valance and the drapes and to direct light rays onto the screen 2, he can accomplish this by moving a U-shaped mask 29, (see Figure 3) into the position shown by the broken lines 29 in the same figure. The mask 29 is carried by the rod 14, and knobs 30 are mounted on the ends of the rod for the purpose of rocking the rod. When the mask 29 is swung into operative position, the mask 16 is swung into inoperative position. This will illuminate only the screen 2. With this arrangement, different transparent members 22 can be placed in the frame 21 and these members moved into registration with the opening 19 when the frame 21 is moved transversely by means of a handle 31 (see Figure 3). Various designs can be thrown upon the screen 2, and these designs may be colored by bringing the disc 24 into play, and the color of the design can be changed by rotating the disc and bringing various colored transparent members into the path of the light rays.

Although I have shown the U-shaped mask 29 for cutting off light rays to the valance and the drapes, the principal object of the invention is to provide means for illuminating the valance and the drapes and, at the same time, cutting off light rays to the screen so that these rays will not interfere with the rays from the moving picture projector. In certain types of pictures, the operator can give a background to the pictures by throwing colored lights on the screen from the projector 8. The mask 16 is swung into inoperative position during this showing.

While I have shown only the preferred form of my invention, it should be understood that various changes or modifications may be made within the scope of the appended claims without departing from the spirit of the invention.

I claim:

1. The combination with a stage having a screen, and a frame for the same, of a light projector having a light opening directed toward the stage, a mask adapted to shade the screen only, and a second mask adapted to shade the frame only, the two masks being hinged on opposite sides of the light opening of the projector for instantaneous adjustment between active and inactive positions.

2. The combination with a stage having a screen, and a frame for the same, of a light projector having a light opening directed toward the stage, a mask adapted to shade the screen only, and a second mask adapted to shade the frame only, the two masks being hinged on opposite sides of the light opening of the projector for instantaneous adjustment between active and inactive positions, and the two masks being complementary in shape for covering the entire light opening when both occupy an active position.

3. The combination with a stage having a screen and a frame for the same, of a light projector having a light opening directed toward the stage and a U-shaped mask adapted to shade the frame only, the mask being hinged at one edge of the light opening for instantaneous adjustment between active and inactive positions.

4. The combination with a stage having a screen, valance and drapes, of a light projector having a light opening and a frame for holding a transparency relative to said opening, and a mask hinged above the light opening and adjacent the frame and swingable down over the light opening for casting a shadow that extends upwardly from the floor of the stage and covers the screen, the screen being of the same width throughout the length thereof.

5. An attachment for a light projector having a light opening and a frame for holding a transparency relative to said opening, comprising a mask hinged on one side of the light opening adjacent the frame and swingable for covering the center of the light opening and a second mask hinged on the opposite side of the light opening adjacent the frame and swingable into a position for covering the remainder of the light opening.

6. An attachment for a light projector having a light opening and a frame for holding a transparency relative to said opening, comprising a U-shaped mask hinged on one side of the light opening adjacent the frame and swingable to extend across the light opening and a second mask hinged on the opposite side of the light opening and swingable for covering the remaining part of the light opening.

7. An article of manufacture comprising a frame defining a light opening, a U-shaped mask hinged relative to one edge of the frame so as to be swingable over the light opening for covering a portion thereof and a second mask hinged relative to an opposite edge of the frame so as to be swingable into a position for covering the space uncovered by the first mask.

WALTER G. PREDDEY.